United States Patent
Uusitalo et al.

(10) Patent No.: US 11,474,501 B2
(45) Date of Patent: Oct. 18, 2022

(54) FOLLOW-UP MODE

(71) Applicant: Valmet Automation Oy, Espoo (FI)

(72) Inventors: Anni Uusitalo, Espoo (FI); Lauri Lehtikunnas, Espoo (FI); Jouni Ruotsalainen, Espoo (FI)

(73) Assignee: VALMET AUTOMATION OY, Espoo (FI)

( * ) Notice: Subject to any disclaimer, the term of this patent is extended or adjusted under 35 U.S.C. 154(b) by 8 days.

(21) Appl. No.: 17/066,845

(22) Filed: Oct. 9, 2020

(65) Prior Publication Data
US 2021/0109505 A1   Apr. 15, 2021

(30) Foreign Application Priority Data
Oct. 10, 2019 (FI) .................................. 20195869

(51) Int. Cl.
*G05B 19/4155* (2006.01)
*G05B 19/406* (2006.01)

(52) U.S. Cl.
CPC ....... *G05B 19/4155* (2013.01); *G05B 19/406* (2013.01); *G05B 2219/31449* (2013.01)

(58) Field of Classification Search
CPC .............. G05B 19/4155; G05B 19/406; G05B 2219/31449; G05B 2219/23131; G05B 2219/31448; G05B 23/0216; G05B 23/0267
See application file for complete search history.

(56) References Cited

U.S. PATENT DOCUMENTS

| | | |
|---|---|---|
| 2004/0085257 A1 | 5/2004 | Tani et al. |
| 2008/0065243 A1 | 3/2008 | Fallman et al. |
| 2016/0292895 A1 | 10/2016 | Billi et al. |
| 2017/0300753 A1 | 10/2017 | Billi et al. |
| 2018/0130260 A1* | 5/2018 | Schmirler ............. G06T 19/006 |

(Continued)

FOREIGN PATENT DOCUMENTS

| | | |
|---|---|---|
| EP | 3318944 A2 | 5/2018 |
| GB | 2513708 A | 11/2014 |
| GB | 2555720 A | 5/2018 |

OTHER PUBLICATIONS

P. S. Sandra, C. M. Sandeep, V. Nair, M. V. Vindhuja, S. S. Nair and M. P. Raja, "WSN based industrial parameter monitoring using smartwatch," 2017 International Conference on Circuit ,Power and Computing Technologies (ICCPCT), 2017, pp. 1-6 (Year: 2017).*

(Continued)

*Primary Examiner* — Christopher E. Everett
(74) *Attorney, Agent, or Firm* — Robert P. Michal, Esq.; Carter, DeLuca & Farrell LLP (57) ABSTRACT

An apparatus, method and computer program product for: receiving information on a configurable set of devices defined as a follow-up group, the set of devices including at least one follow-up device configured to at least temporarily operate in a follow-up mode, receiving an instruction to select first process information provided by the industrial process control system, activating a follow-up mode on the at least one follow-up device, determining second process information based on the first process information and instructing the at least one follow-up device to present the second process information according to the follow-up mode.

16 Claims, 3 Drawing Sheets

(56) References Cited

U.S. PATENT DOCUMENTS

2019/0102075 A1   4/2019   Naidoo et al.

OTHER PUBLICATIONS

Office Action issued by the Finnish Patent and Registration Office in relation to Finnish Application No. 20195869 dated Aug. 10, 2020 (6 pages).
Extended European Search Report issued by the European Patent Office in relation to European Application No. 20200961.9 dated Feb. 19, 2021 (11 pages).
Finnish Search Report issued by the Finnish Patent and Registration Office in relation to Finnish Application No. 20195869 dated Feb. 10, 2020 (2 pages).

* cited by examiner

FOLLOW-UP MODE

CROSS-REFERENCE TO RELATED APPLICATIONS

This application claims priority to Finnish Patent Application No. 20195869, filed Oct. 10, 2019, the disclosure of this application is expressly incorporated herein by reference in its entirety.

TECHNICAL FIELD

The present application relates generally to a follow-up mode. More specifically, the present application relates to instructing a device to operate in a follow-up mode.

BACKGROUND

Typically, industrial processes are monitored and controlled by operators using a plurality of displays in a control room. Different displays may display information from different parts of the process.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprised by an industrial process control system, the industrial process control system further comprising at least one display and a plurality of inputs and outputs for monitoring and controlling an industrial process, the apparatus comprising means for performing: receiving information on a configurable set of devices defined as a follow-up group, the set of devices comprising at least one follow-up device configured to at least temporarily operate in a follow-up mode, receiving an instruction to select first process information provided by the industrial process control system, activating a follow-up mode on the at least one follow-up device, determining second process information based on the first process information and instructing the at least one follow-up device to present the second process information according to the follow-up mode.

According to a second aspect of the invention, there is provided a method for monitoring and controlling process information by an industrial process control system, the industrial process control system comprising at least one one processor and at least one memory including computer program code, a plurality of inputs and outputs for monitoring and controlling the industrial process and at least one display, the method comprising: receiving information on a configurable set of devices defined as a follow-up group, the set of devices comprising at least one follow-up device configured to at least temporarily operate in a follow-up mode, receiving an instruction to select first process information provided by the industrial process control system, activating a follow-up mode on the at least one follow-up device, determining second process information based on the first process information and instructing the at least one follow-up device to present the second process information according to the follow-up mode.

According to a third aspect of the invention, there is provided a computer program comprising instructions for causing an apparatus, comprised by an industrial process control system comprising a plurality of inputs and outputs for monitoring and controlling the industrial process and at least one display, to perform at least the following: receiving information on a configurable set of devices defined as a follow-up group, the set of devices comprising at least one follow-up device configured to at least temporarily operate in a follow-up mode, receiving an instruction to select first process information provided by the industrial process control system, activating a follow-up mode on the at least one follow-up device, determining second process information based on the first process information and instructing the at least one follow-up device to present the second process information according to the follow-up mode.

According to a fourth aspect of the invention, there is provided an apparatus comprised by an industrial process control system, the industrial process control system further comprising at least one display and a plurality of inputs and outputs for monitoring and controlling an industrial process, the apparatus comprising at least one processor and at least one memory including computer program code, the at least one memory and the computer program code configured to, with the at least one processor, cause the apparatus at least to: receive information on a configurable set of devices defined as a follow-up group, the set of devices comprising at least one follow-up device configured to at least temporarily operate in a follow-up mode, receive an instruction to select first process information provided by the industrial process control system, activate a follow-up mode on the at least one follow-up device, determine second process information based on the first process information and instruct the at least one follow-up device to present the second process information according to the follow-up mode.

According to a fifth aspect of the invention, there is provided a non-transitory computer readable medium comprising program instructions for causing an apparatus, comprised by an industrial process control system comprising a plurality of inputs and outputs for monitoring and controlling the industrial process and at least one display, to perform at least the following: receiving information on a configurable set of devices defined as a follow-up group, the set of devices comprising at least one follow-up device configured to at least temporarily operate in a follow-up mode, receiving an instruction to select first process information provided by the industrial process control system, activating a follow-up mode on the at least one follow-up device, determining second process information based on the first process information and instructing the at least one follow-up device to present the second process information according to the follow-up mode.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to a follow-up mode in an industrial process control system. More particularly, example embodiments relate to instructing a follow-up device to operate in a follow-up mode.

According to an example embodiment, an apparatus is configured to receive information on a set of devices defined as a follow-up group, the set of devices comprising at least one follow-up device configured to at least temporarily operate in a follow-up mode. The set of devices may comprise a configurable set of devices. The apparatus is further configured to receive an instruction to select first process information provided by an industrial process control system and activate a follow-up mode on the at least one follow-up device. The apparatus is yet further configured to determine second process information based on the first process information and instruct the at least one follow-up device to present the second process information according to the follow-up mode.

An industrial process control system may comprise a plurality of displays providing a graphical user interface for monitoring and/or controlling an industrial process. Some of the displays may be used for presenting information on a high abstraction level while other displays may be used for operating the industrial process. An operator may need to follow different displays in different situations. When a problem occurs in an industrial process, it may be challenging to identify in a control room what is actually causing the problem and the situation may require closer examination of the situation in the field. On the other hand, it may be challenging to identify the physical component causing the problem in the field as monitors for checking the problem may not be available in the field.

Graphical user interfaces used for monitoring and controlling an industrial process may comprise a plurality of views of the process. A view may comprise, for example a process page view presenting a complete process, a subprocess, a portion of the process, one or more process components, measurement information relating to the process presented in the view, alarms or any other suitable information. A view presented on the graphical user interface typically corresponds to the physical industrial process and is configured to present real-time information on the industrial process. The real-time information may be collected by, for example, sensors in different parts of the industrial process.

Figure 1:
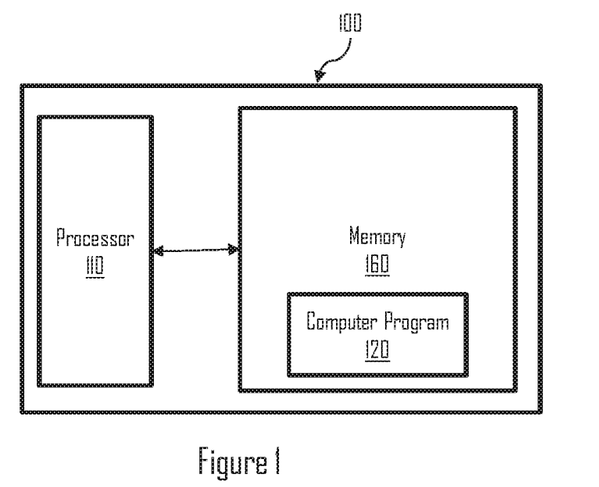
FIG. 1 shows a block diagram of an example apparatus in which examples of the disclosed embodiments may be applied.

FIG. 1 is a block diagram depicting an apparatus 100 operating in accordance with an example embodiment of the invention. The apparatus 100 may be, for example, an electronic device such as a chip or a chip-set. The apparatus 100 comprises one or more control circuitry, such as at least one processor 110 and at least one memory 160, including one or more algorithms such as computer program code 120 wherein the at least one memory 160 and the computer program instructions are configured, with the at least one processor 110 to cause the apparatus to carry out any of example functionalities described below.

In the example of FIG. 1, the processor 110 is a control unit operatively connected to read from and write to the at least one memory 160. The processor 110 may also be configured to receive control signals received via an input interface and/or the processor 110 may be configured to output control signals via an output interface. In an example embodiment the processor 110 may be configured to convert the received control signals into appropriate commands for controlling functionalities of the apparatus.

The at least one memory 160 stores computer program code 120 which when loaded into the processor 110 control the operation of the apparatus 100 as explained below. In other examples, the apparatus 100 may comprise more than one memory 160 or different kinds of storage devices.

Computer program code 120 for enabling implementations of example embodiments of the invention or a part of such computer program code may be loaded onto the apparatus 100 by the manufacturer of the apparatus 100, by a user of the apparatus 100, or by the apparatus 100 itself based on a download program, or the code can be pushed to the apparatus 100 by an external device. The computer program code may arrive at the apparatus 100 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

Figure 2:
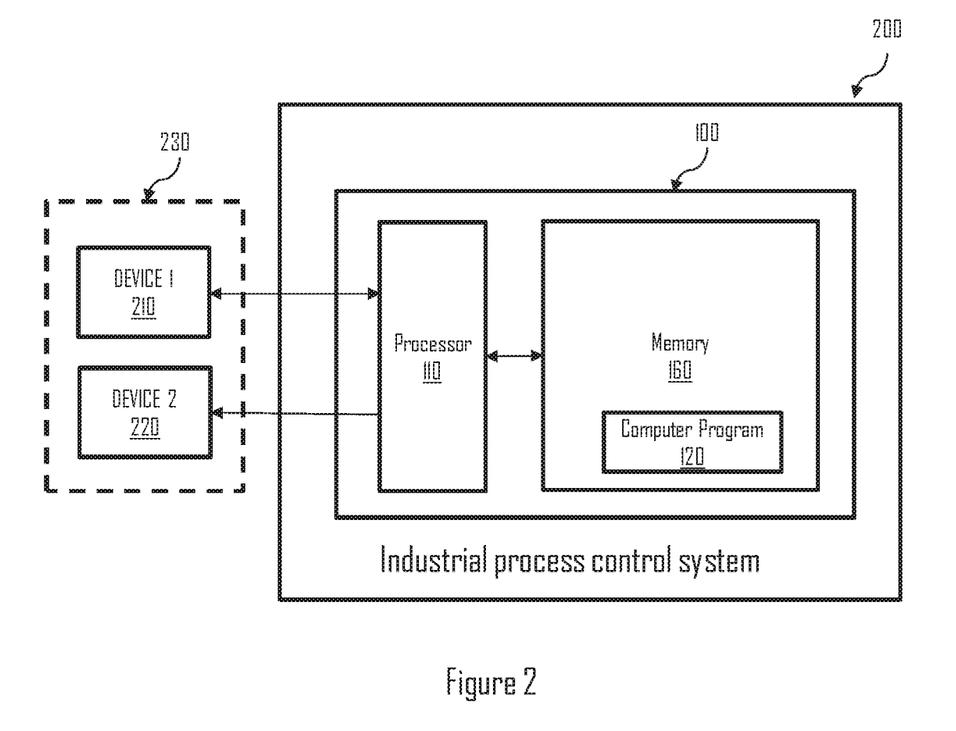
FIG. 2 shows a block diagram of an example industrial process control system.

FIG. 2 is a block diagram depicting an industrial process control system in accordance with an example embodiment of the invention. The industrial process control system comprises a platform for process control. The industrial process control system is configured to monitor and control an industrial process. The industrial process control system may comprise, for example, process control, machine control, drive control, quality control, condition monitoring and/or information management. According to an example embodiment, the industrial process control system comprises an automation system configured to collect data from an industrial process and perform controlling of the industrial process based on the collected data.

According to an example embodiment, the industrial process control system is operatively connected to a plurality of displays for presenting information on the industrial process. The plurality of displays may comprise displays that are comprised by the industrial process control system and/or separate displays that are operatively connected to the industrial process control system. The information may be presented visually and/or audibly using a graphical user interface of a display and/or loudspeakers. A user interface presenting process information may be provided using, for example, web-based technologies such as different mark-up languages. For example, a user interface may be provided using extensible mark-up language (XML) or hypertext mark-up language (HTML) such as native HTML5. The user interface may also comprise dynamic elements. The dynamic elements may be provided using a script language such as JavaScript or embedded code such as Java.

Without limiting the scope of the claims, an advantage of providing a web-based user interface for monitoring and controlling an industrial process may be that the industrial process control system may be accessed using different kinds of devices using a normal web browser.

According an example embodiment, the industrial process control system further comprises at least one display and a plurality of inputs and outputs for monitoring and controlling an industrial process.

According to an example embodiment, the industrial process control system comprises the apparatus 100. The apparatus 100 may be a module comprised by the industrial process control system or a portion of the industrial process control system. The apparatus 100 comprised by the industrial process control system is configured to communicate with one or more follow-up devices via a wireless connection.

According to an example embodiment, a follow-up device is a device that is configured to follow instructions received from the apparatus 100. An instruction from the apparatus 100 may comprise a specific instruction for performing an operation, a general instruction to follow selections and/or operations performed by the apparatus 100 or the like.

A follow-up device may be a read-only device that is configured to present information instructed by the apparatus 100 or a follow-up device may be communication device that is, in addition to receiving instructions from the apparatus 100, configured to send instructions to the apparatus 100. In the example of FIG. 2, device 210 is a communication device and device 220 is a read-only device. A follow-up device may be a dedicated follow-up device or a device that can be configured to temporarily operate in a follow-up mode.

A follow-up mode comprises a mode in which a follow-up device operates in dependence upon a master device such as the apparatus 100. A master device may be used for controlling more than one follow-up devices. In other words, an operation of a follow-up device depends upon instructions received from a master device. An instruction received form a master device may comprise, for example, a session related instruction such as an instruction to activate or deactivate a follow-up mode in the follow-up device, or a mode instruction such as an instruction defining information to be presented by the follow-up device.

Different follow-up modes may have different parameters. According to an example embodiment, one or more parameters define the type of information presented in the follow-up mode.

A follow-up mode may be a temporary mode or a continuous mode. For example, a device that is a dedicated follow-up device, may be operated in a continuous follow-up mode. As another example, a device that is used also for other, different things, may be operated in a temporary follow-up mode such that the follow-up mode may be activated and deactivated when necessary.

The group of follow-up devices may comprise one or more devices, for example, an electronic device such as a hand-portable device, a mobile phone or a Personal Digital Assistant (PDA), a Personal Computer (PC), a laptop, a desktop, a tablet computer, or a media player. In the examples below it is assumed that the apparatus 200 is a mobile computing device or a part of it.

According to an example embodiment, the industrial process control system 200 is configured to establish radio communication with at least one device in the group of devices 230 using a wireless communication connection such as a Bluetooth, WiFi, or a mobile connection.

According to an example embodiment, the apparatus 100 is configured to receive information on a configurable set of devices defined as a follow-up group, the set of devices comprising at least one follow-up device configured to at least temporarily operate in a follow-up mode. A set of devices may comprise one or more devices.

According to an example embodiment, a follow-up device configured to at least temporarily operate in a follow-up mode comprises a follow-up device in which the follow-up mode may be activated and deactivated. According to another example embodiment, a follow-up device configured to at least temporarily operate in a follow-up mode comprises a follow-up device configured to continuously operate in a follow-up mode.

According to an example embodiment, a configurable set of devices defined as a follow-up group comprises a set of devices that may be modified by adding devices to the set and/or removing devices from the set.

Information on a set of devices defined as a follow-up group may comprise, for example, a list of wireless devices included in the follow-up group. Information on set of devices may further comprise, for example, device specific information such as identification information, type information, capability information or any combination thereof. Identification information may comprise an identification code that enables identifying a device. Type information may comprise, for example, information on a type of the device such as whether the device is a smartphone, a tablet, a pair of augmented reality (AR) glasses or a combination thereof. Capability information may comprise, for example, information on one or more capabilities of the device such as information on processing power, types of supported connections (e.g. Bluetooth, WiFi or other wireless connections), the amount of available memory, screen size and/or resolution, available colors, available controls, screen haptic dimensions such as 2D and 3D, or any combination thereof.

According to an example embodiment, the apparatus 100 is configured to receive information on a set of devices defined as a follow-up group horn a user. The set of devices may be defined in the settings of the apparatus 100 or the settings of the industrial process control system 200. For example, a user may create a follow-up group by adding devices to the follow-up group using, for example, a selection menu. According to another example embodiment, the apparatus 100 is configured to automatically receive information on a set of devices defined as a follow-up group. For example, the apparatus 100 may be configured to receive information on one or more devices previously used as follow-up devices and determine those as belonging to a follow-up group, or the apparatus 100 may be configured to receive information on one or more available follow-up devices.

According to an example embodiment, the at least one follow-up device comprises at least one wireless follow-up device.

According to an example embodiment, the at least one follow-up device comprises at least one of the following: a smartphone, a smartwatch, augmented reality glasses or a separate display. A separate display may comprise a wearable display such as a display attached to clothing, safety equipment or any other carrying item. It may also be woven to clothing.

Without limiting the scope of the claims, an advantage of a follow-up device being a wireless device may be that it can be carried along when an operator, for example, needs to check a cause of a problem in the field. In other words, installation of a plurality of monitoring devices in different places in a factory may be avoided when using a wireless follow-up device.

According to an example embodiment, the apparatus 100 is configured to modify the set of devices in response to a user input. The user may modify the set of defined follow-up devices by adding and/or removing devices included in the set of devices. The apparatus 100 may also be configured to modify the set of devices dynamically, for example, automatically adding follow-up devices that become available and removing follow-up devices that are not available. A follow-up device may be added to the set of devices, for example, in response to registering a device as a follow-up device. Registering a device as a follow-up device may comprise, for example, detecting the device in a pre-determined physical registering area, touching a pre-determined registering device with the device, keeping the device in close proximity to a pre-determined registering device, performing a registering operation with the device or any combination thereof. A registering device may comprise, for example, an identification module such as a near field communication (NFC) tag or a radio frequency identification (RFID) tag, Performing a registering operation may comprise, for example, taking a picture of a visible code such as a barcode or a QR code such that the code causes registering the device as a follow-up device.

According to an example embodiment, registering a device as a follow-up device comprises registering the device as a device suitable for operating in a follow-up mode. The apparatus 100 may be configured to, in response to registering the device as a device suitable for operating in a follow-up device, add the registered device to the set of devices. According to another example embodiment, registering a device as a follow-up device comprises activating the device in a follow-up mode. The apparatus 100 may be configured to, in response to registering the device as a follow-up device, activate the device in a follow-up mode such that the device starts to present information in the follow-up mode.

According to an example embodiment, the apparatus 100 is configured to receive an instruction to select first process information provided by the industrial process control system. An instruction to select first process information may be received form a user, for example, in response to a user selecting the first process information on a graphical user interface using, for example, a touch screen, a mouse, a stylus or gaze tracking.

As another example, an instruction to select first process information may be received from an industrial process control system, for example, in response to the industrial process control system detecting that a criterion is fulfilled. The criterion may relate to, for example, an occurred alarm, a measurement value, a threshold value and/or an occurred event.

The first process information may comprise, for example, a process page comprising information on an industrial process or a subprocess, a process component comprising information on the process component in an industrial process or the like.

According to an example embodiment, the apparatus 100 is configured to activate a follow-up mode on the at least one follow-up device. The apparatus 100 may be configured to activate the follow-up mode by sending an instruction to the at least one follow-up device. According to an example embodiment, the apparatus 100 is configured to activate a follow-up mode in response to receiving an instruction to select first process information. According to another example embodiment, the apparatus 100 is configured to activate a follow-up mode in response to receiving a user input to activate the follow-up mode.

The apparatus 100 may be configured to activate different kinds of follow-up modes. A follow-up mode may comprise, for example, a general follow-up mode such as a process page follow-up mode or a component specific follow-up mode such as a process component follow-up mode.

According to an example embodiment, a follow-up mode comprises a process page follow-up mode. A process page follow-up mode enables follow-up of larger entities at different time instances such as a process or a sub-process in the past, present and/or predicted future. According to an example embodiment, a follow-up device operating in a process page follow-up mode is configured to present process information corresponding to process information presented by a master device such that the process information presented by the master device comprises process information relating to a first point in time and the process information presented by the follow-up device comprises process information relating to a second point in time. The first point in time may be different from the second point in time. For example, the first point in time may comprise a current moment and the second point in time may comprise a past or future moment.

According to another example embodiment, a follow-up mode comprises a process component follow-up mode. A process component follow-up mode enables follow-up of individual process components such as pumps, valves, containers or the like. According to an example embodiment, a follow-up device operating in a process component follow-up mode is configured to present information relating to a process component that is presented/selected by a master device. The information relating to a process component presented by the follow-up device may comprise information that is specific to the process component. For example, the information relating to the process component may comprise more detailed information or supporting information such as documentation relating to the process component.

According to an example embodiment, the apparatus 100 is configured to deactivate the follow-up mode.

Without limiting the scope of the claims, an advantage of activating and deactivating a follow-up mode may be that the follow-up device may be used for other things when it is not used as a follow-up device.

According to an example embodiment, the apparatus 100 is configured to determine a follow-up mode in response to receiving an instruction to select first process information. According to another example embodiment, the apparatus 100 is configured to determine a follow-up mode in response to receiving an indication of selected first process information. Determining a follow-up mode may comprise, for example, selecting a suitable follow-up mode.

According to an example embodiment, the apparatus 100 is configured to activate a follow-up mode based on the selected first information. For example, if the selected first information comprises a process page, a process page follow-up mode may be activated. If the selected first information comprises a process component, a process component follow-up mode may be activated.

The apparatus 100 may be configured to activate different follow-up modes on different follow-up devices. For example, the apparatus 100 may be configured to activate a first follow-up mode on a first follow-up device and a second follow-up mode on a second follow-up device. The apparatus 100 may also be configured to activate the same follow-up mode on different follow-up devices. For example, assuming that solving a problem in the industrial process requires more than one person at different parts of a factory, the same information may be presented to all the persons trying to fix the problem.

The apparatus may be configured to activate a follow-up mode automatically or in response to a manual instruction to activate the follow-up mode. According to an example embodiment, the apparatus 100 is configured to activate the follow-up mode in response to receiving information from the industrial process control system that a predetermined criterion is fulfilled.

The predetermined criterion may relate to the industrial process or a status of a follow-up device. According to an example embodiment, a predetermined criterion comprises at least one of the following: an alarm is detected, a predetermined event occurs, an available follow-up device is detected, or a follow-up device is detected in a particular location. An alarm, a predetermined event, an available follow-up device and a follow-up device in a particular location may be detected by an industrial process control system.

For example, assuming the industrial process control system receives an indication of an occurred alarm, the apparatus 100 may be configured to automatically activate a follow-up mode on at least one wireless follow-up device. The apparatus 100 may be configured to instruct the at least one wireless follow-up device to present information relating to a component initially causing the alarm. In other words, the apparatus 100 may be configured to filter the alarms such that a cause of the first alarm is presented on the follow-up device.

As another example, the industrial process control system may receive an indication of an event such as that a manufacturing product is finished. In such a case, the apparatus 100 may be configured to automatically activate a follow-up mode on at least one wireless follow-up device. The apparatus 100 may be configured to instruct the at least one wireless follow-up device to present predetermined information on the event.

As a further example, the industrial process control system may receive an indication that an available follow-up device is detected. An available follow-up device may comprise, for example, a device that is available to be used in a follow-up mode or a new follow-up device detected by the industrial process control system. For example, the apparatus 100 may be configured to automatically activate the at least one wireless follow-up device in response to receiving an indication that a new device is detected in a factory's wireless network. For example, assuming it is detected that a truck driver's tablet has entered the factory area, the apparatus 100 may be configured to present information on the truck driver's tablet.

As a yet further example, the apparatus 100 may be configured to activate the at least one wireless follow-up device in response to receiving an indication that the follow-up device is detected in a particular location. For example, the apparatus 100 may be configured to activate the at least one wireless follow-up device if it is detected that the follow-up device is not in a control room. Therefore, the apparatus 100 may be configured to receive information status and/or location of a wireless follow-up device.

According to another example embodiment, the apparatus 100 is configured to activate the follow-up mode in response to a user input. Activating a follow-up mode in response to a user input may comprise activating the follow-up mode in response to a user input on the follow-up device or on the industrial process control system. For example, an operator may activate a follow-up device by selecting the follow-up device using the industrial process control system.

According to an example embodiment, the apparatus 100 is configured to determine second process information based on the first process information. Determining second process information may comprise determining one or more characteristics of the first process information and determining the second process information based on the one or more characteristics. The one or more characteristics may comprise, for example, a type of selected first information (e.g. a process page or a process component), content of the selected first information and/or whether the first process information is associated with or depends upon further information.

The second process information may comprise information that relates to the first process information, depends upon the first process information, comprises a subset of first process information, comprises information caused by the first process information or any combination thereof. The second process information may comprise same information as the first process information.

Without limiting the scope of the claims, an advantage of determining second process information based on the first process information may be that, the first information may be used as a criterion for selecting the second information such that a user may be provided with information that is considered relevant. Thereby, there is no need to present all the information all the time, but information may be presented based on user needs.

According to an example embodiment, the second process information comprises time-based information. According to an example embodiment, the second process information comprises history and/or future information relating to the first information. History information may comprise information corresponding to the first process information at an earlier time instance. Future information may comprise, for example, a prediction or simulation of upcoming process information.

The second process information may comprise information that is supporting information to the first information. For example, the second process information may comprise more detailed information, parameters or documentation relating to the first information.

According to another example embodiment, the second process information comprises more detailed information of the first process information, the more detailed information comprising a faceplate of a component relating to the first process information, documentation relating to the first process information or a predetermined view on the industrial process relating to the first information. According to an example embodiment, the second process information comprises the first process information.

A faceplate of a component comprises an item on a graphical user interface. The item comprises information on the component such as technical characteristics of the component, measured values relating to the component or the like.

According to an example embodiment, the apparatus 100 is configured to instruct the at least one follow-up device to present the second process information according to the follow-up mode. Presenting second process information according to a follow-up mode may comprise presenting the second process information in dependence upon the follow-up mode parameters.

Without limiting the scope of the claims, an advantage of presenting second process information may be that a user may see supporting information before making any decisions on controlling an industrial process.

Figure 3:
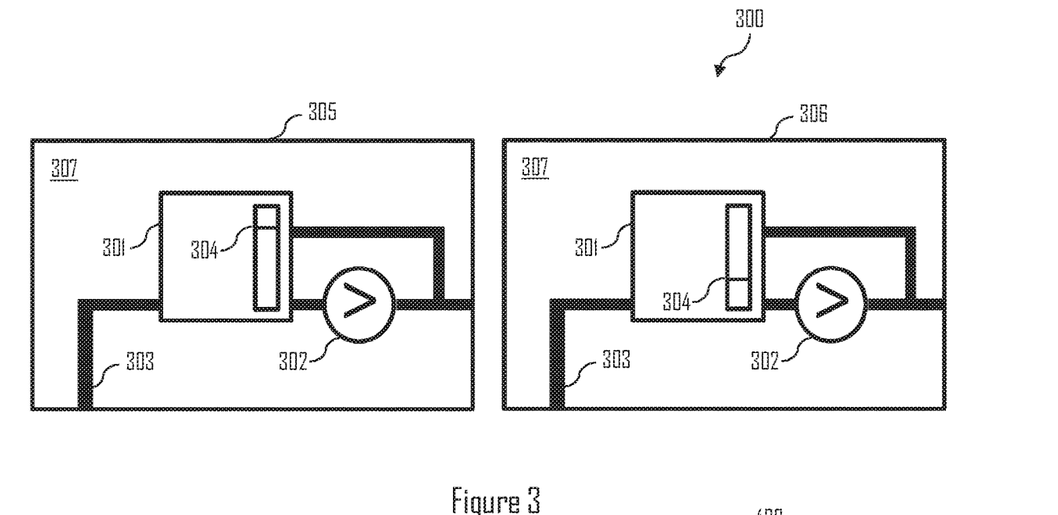
FIG. 3 shows an example of a follow-up mode.

FIG. 3 illustrates an example of a follow-up mode. More specifically, FIG. 3 illustrates an example of a process page follow-up mode.

In the example of FIG. 3, a process page 307 relating to an industrial process is presented on a follow-up device 305 and a master device 306. In this example, the master device 306 communicates with the apparatus 100 and the apparatus 100 sends instructions to the follow-up device 305. It should be noted that the master device 306 may also control more than one follow-up device. In the example of FIG. 3, the master device 306 and the follow-up device 305 present the same process page 307 comprising the same components such as a container 301 containing liquid, a pump 302, a pipe 303 and an indication of a liquid level 304 in the container 301. The master device 306 is configured to enable real-time monitoring and control of the industrial process. The follow-up device 305 is configured to follow instructions received from the master device 306.

In the example of FIG. 3, the master device 306 is configured to present real-time information, while the follow-up device 305 is configured to present history information relating to the process page 307 presented on the master device 306. History information may comprise earlier process information relating to the process page 307 presented on the master device 306. The apparatus 100 may be configured to receive an instruction from a user for selecting the history information. History information may comprise, for example, process information 30 minutes, 1 hour, 1 week or 2 months earlier.

Figure 4:
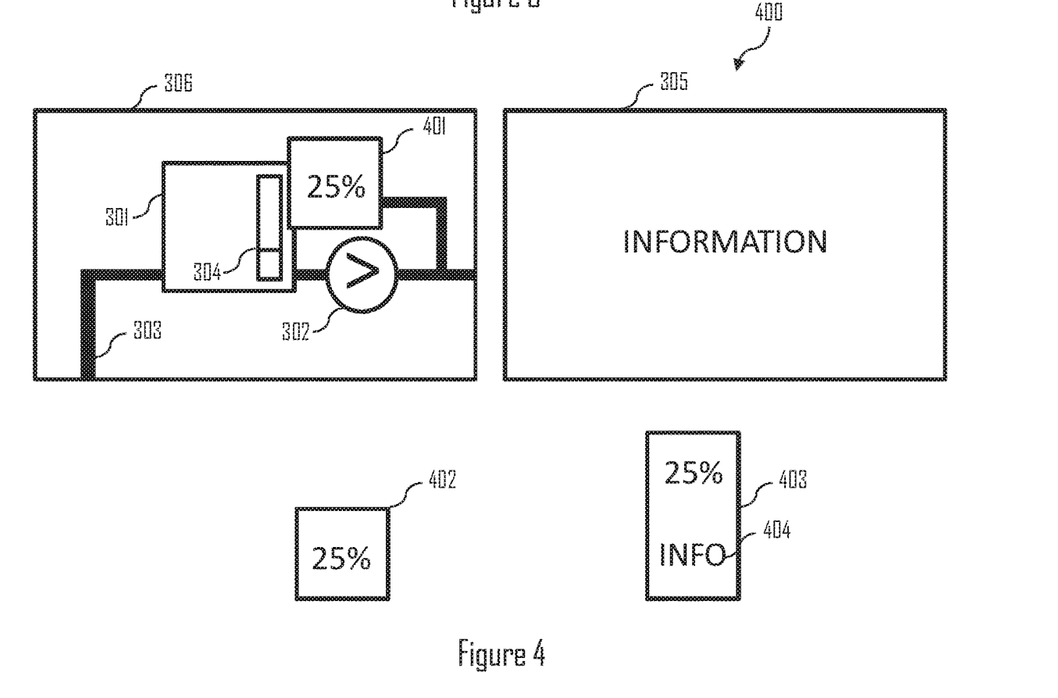
FIG. 4 shows another example of a follow-up mode.

FIG. 4 illustrates another example of a follow-up mode. More specifically, FIG. 4 illustrates an example of a process component follow-up mode.

In the example of FIG. 4, a master device 306 presents a process page relating to an industrial process. Device 305 is configured to act as a follow-up device. An operator has selected the container 301 for monitoring information relating to the container 301 in more detail. In response to selecting the container 301, a faceplate 401 comprising information on the container 301 is presented. In the example of FIG. 4, the faceplate 401 comprises information on a liquid level 304 in the container 301. In this example, the liquid level is 25%.

In response to selecting the container 301, the master device 306 instructs the follow-up device 305 to display further information on the container 301. Further information may comprise, for example, documentation relating to the container 301. In the example of FIG. 4, the master device 306 is configured to instruct at least one further device to act as a follow-up device. An examples of further follow-up devices may be, for example, a smartwatch 402 or a tablet 403.

Different follow-up devices may be configured to present different amount of information. For example, in the example of FIG. 4, the smartwatch 402 is configured to present the liquid level 304 and the tablet 403 is configured to present the liquid level 304 and further information 404. The amount of information presented by a follow-up device may depend upon the physical characteristics of the follow-up device. For example, if a follow-up device comprises a small display, less information may be presented compared to a follow-up device comprising a larger display.

Figure 5:
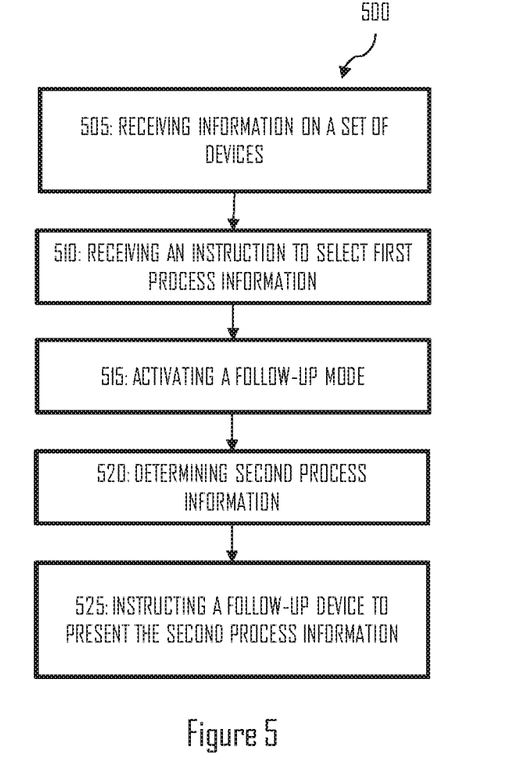
FIG. 5 illustrates an example method according to an example embodiment of the invention.

FIG. 5 illustrates a method 500 incorporating aspects of the previously disclosed embodiments. More specifically, the example method 500 illustrates instructing a follow-up device to present process information. The method may be performed by the apparatus 100 or the industrial process control system 200.

The method starts with receiving 505 information on a set of follow-up devices defined as a follow-up group, the set of devices comprising at least one follow-up device configured to operate in a follow-up mode. The set of follow-up devices may comprise a configurable set of follow-up devices and the at least one follow-up device may be configured to at least temporarily operate in a follow-up mode. The at least one follow-up device may comprise a wireless device.

The method continues with receiving 510 an instruction to select first process information provided by the industrial process control system. The first process information may comprise, for example, a process page comprising information on an industrial process or a subprocess, a process component comprising information on the process component in an industrial process or the like.

The method continues with activating 515 a follow-up mode on the at least one follow-up device. The at least one follow-up device may comprise, for example, a smartwatch, a smartphone, AR glasses or a dedicated display.

The method continues with determining 520 second process information based on the first process information. The second process information may comprise information that relates to the first process information, a subset of first process information, information caused by the first process information or any combination thereof. The second process information may also comprise first process information.

The method yet further continues with instructing 525 the at least one follow-up device to present the second process information according to the follow-up mode.

Figure 6:
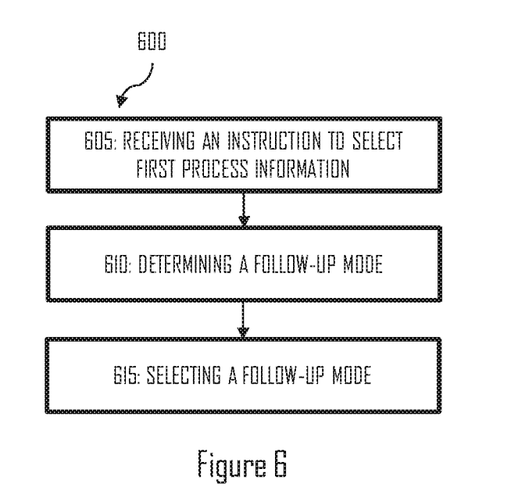
FIG. 6 illustrates another example method according to an example embodiment of the invention.

FIG. 6 illustrates a method 600 incorporating aspects of the previously disclosed embodiments. More specifically, the example method 600 illustrates selecting a follow-up mode. The method may be performed by the apparatus 100 or the industrial process control system 200.

The method starts with receiving 605 an instruction to select first process information. The instruction may be received from a user of it may be received from the industrial process control system 200.

The method continues with determining 610 a follow-up mode. A follow-up mode may be determined based on the first process information. Determining a follow-up mode may comprise determining content of the first process information. For example, if the first process information comprises a process page, a process page follow-up mode may be determined. If the first process information comprises a process component, a process component follow-up mode may be determined.

The method further continues with selecting 615 a follow-up mode. Selecting a follow-up mode may cause activating the selected follow-up mode.

Without limiting the scope of the claims, an advantage of instructing a wireless follow-up device to present information in an industrial process environment may be that an operator has access to the information available in a control room also in the field. Another advantage may be that a master device may present main information and a follow-up device may present supporting information that relates to the main information, thereby enabling a user to concentrate on specific information while also enabling receiving information on a larger entity. A further advantage may be that it is easier for the operator to analyse the process when a portion of the process may be analysed on a separate display. A yet further advantage may be that it may be easier to train operators when the trainee receives additional information on, for example, the actions needed.

Without in any way limiting the scope, interpretation, or application of the claims appearing below, a technical effect of one or more of the example embodiments disclosed herein is that the number of needed monitoring devices in the field may be reduced. Another technical effect is that controlling of an industrial process is more efficient as relevant information is selected to be displayed. A further technical effect is that an operator does not need to switch the main displays of the industrial process control system from a first state to a second state in order to monitor a part of the industrial process. A yet further technical effect is that the industrial process may be monitored and/controlled from different parts of a factory.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software; firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus of an industrial process control system, the industrial process control system comprising at least one display and a plurality of inputs and outputs for monitoring and controlling an industrial process, the apparatus comprising:

at least one processor; and at least one memory including computer program code, the at least one memory and the computer program code configured to, with the at least one processor, cause the apparatus at least to:

receive information on a configurable follow-up group, the follow-up group comprising at least one follow-up device configured to at least temporarily operate in a follow-up mode in which mode the operation of the at least one follow-up device depends upon instructions received from the apparatus such that, in the follow-up mode, the apparatus controls the at least one follow-up device;

receive an instruction provided by the industrial process control system and which selects first process information displayed on the at least one display of the industrial process control system, the first process information relating to at least one of monitoring or controlling an industrial process;

determine a type of the first process information;

activate a follow-up mode on the at least one follow-up device;

determine, based on the type of the first process information, second process information relating to at least one of monitoring or controlling the industrial process;

send an instruction to the at least one follow-up device according to the activated follow-up mode, the instruction instructing the at least one follow-up device to present the second process information on at least one display of the at least one follow-up device; and deactivate the follow-up mode on the at least one follow-up device, wherein the at least one follow-up device operates independently from the apparatus when the follow-up mode is deactivated.

2. The apparatus according to claim 1, wherein in activating the follow-up mode, the at least one memory and the computer program code are configured to, with the at least one processor, cause the apparatus to activate the follow-up mode in response to a user input or in response to receiving information from the industrial process control system that a predetermined criterion is fulfilled.

3. The apparatus according to claim 2, wherein the criterion comprises at least one of: an alarm is detected, a pre-determined event occurs, an available follow-up device is detected or a follow-up device is detected in a particular location.

4. The apparatus according to claim 1, wherein the follow-up mode comprises a process page follow-up mode or a process component follow-up mode.

5. The apparatus according to claim 1, wherein the second process information comprises predicted future information relating to the first process information.

6. The apparatus according to claim 1, wherein the second process information comprises a more detailed information of the first process information, the more detailed information comprising at least one of: a faceplate of a component relating to the first process information, documentation relating to the first process information, or a predetermined view on the industrial process relating to the first process information.

7. The apparatus according to claim 1,
wherein the at least one follow-up device comprises at least one of: a smartphone, a smartwatch, augmented reality glasses, or a display screen.

8. The apparatus according to claim 1, wherein the at least one memory and the computer program code are configured to, with the at least one processor, further cause the apparatus to modify the follow-up group in response to a user input.

9. A method in an apparatus of an industrial process control system, the apparatus comprising at least one processor and at least one memory including computer program code, the industrial process control system comprising a plurality of inputs and outputs for monitoring and controlling the industrial process and at least one display, the method comprising:
receiving information on a configurable follow-up group, the follow-up group comprising at least one follow-up device configured to at least temporarily operate in a follow-up mode in which mode the operation of the at least one follow-up device depends upon instructions received from the apparatus such that, in the follow-up mode, the apparatus controls the at least one follow-up device;
receiving an instruction provided by the industrial process control system and which selects first process information displayed on the at least one display of the industrial process control system, the first process information relating to at least one of monitoring or controlling an industrial process;
determining a type of the first process information;
activating a follow-up mode on the at least one follow-up device;
determining, based on the type of the first process information, second process information relating to at least one of monitoring or controlling the industrial process;
sending an instruction to the at least one follow-up device according to the activated follow-up mode, the instruction instructing the at least one follow-up device to present the second process information on at least one display of the at least one follow-up device; and
deactivating the follow-up mode on the at least one follow-up device, wherein the at least one follow-up device operates independently from the apparatus when the follow-up mode is deactivated.

10. The method according to claim 9, wherein the follow-up mode comprises a process page follow-up mode or a process component follow-up mode.

11. The method according to claim 9, wherein the second process information comprises predicted future information relating to the first process information.

12. The method according to claim 9, wherein the second process information comprises a more detailed information of the first process information, the more detailed information comprising at least one of: a faceplate of a component relating to the first process information, documentation relating to the first process information or a predetermined view on the industrial process relating to the first process information.

13. A non-transitory computer readable medium comprising instructions for an apparatus of an industrial process control system, the industrial process control system comprising a plurality of inputs and outputs for monitoring and controlling the industrial process and at least one display, the instructions, when executed by at least one processor of the apparatus, causes the apparatus to perform at least the following:
receiving information on a configurable follow-up group, the follow-up group comprising at least one follow-up device configured to at least temporarily operate in a follow-up mode in which mode the operation of the at least one follow-up device depends upon instructions received from the apparatus such that, in the follow-up mode, the apparatus controls the at least one follow-up device;
receiving an instruction provided by the industrial process control system and which selects first process information displayed on the at least one display of the industrial process control system, the first process information relating to at least one of monitoring or controlling an industrial process;
determining a type of the first process information;
activating the follow-up mode on the at least one follow-up device;
determining, based on the type of the first process information, second process information relating to at least one of monitoring or controlling the industrial process;
sending an instruction to the at least one follow-up device according to the activated follow-up mode, the instruction instructing the at least one follow-up device to present the second process information on at least one display of the at least one follow-up device; and
deactivating the follow-up mode on the at least one follow-up device, wherein the at least one follow-up device operates independently from the apparatus when the follow-up mode is deactivated.

14. The non-transitory computer readable medium according to claim 13, wherein the follow-up mode comprises a process page follow-up mode or a process component follow-up mode.

15. The non-transitory computer readable medium according to claim 13, wherein the second process information comprises predicted future information relating to the first process information.

16. The non-transitory computer readable medium according to claim 13, wherein the second process information comprises a more detailed information of the first process information, the more detailed information comprising at least one of: a faceplate of a component relating to the first process information, documentation relating to the first process information or a predetermined view on the industrial process relating to the first process information.

* * * * *